US005929577A

United States Patent [19]
Neidorff et al.

[11] Patent Number: 5,929,577
[45] Date of Patent: Jul. 27, 1999

[54] BRUSHLESS DC MOTOR CONTROLLER

[75] Inventors: Robert A. Neidorff, Bedford; David S. Zendzian; John A. O'Connor, both of Merrimack, all of N.H.

[73] Assignee: Unitrode Corporation, Merrimack, N.H.

[21] Appl. No.: 08/972,095

[22] Filed: Nov. 17, 1997

Related U.S. Application Data

[63] Continuation of application No. 08/542,806, Oct. 13, 1995, abandoned.

[51] Int. Cl.⁶ .................................................... H02K 23/00
[52] U.S. Cl. ........................ 318/254; 318/138; 318/439; 318/599; 318/432
[58] Field of Search .............................................. 318/254

[56] References Cited

U.S. PATENT DOCUMENTS

| | | | |
|---|---|---|---|
| 4,051,417 | 9/1977 | Fujinawa et al. | 318/138 |
| 4,162,435 | 7/1979 | Wright | 318/138 |
| 4,210,851 | 7/1980 | Wakamiya | 318/257 |
| 4,240,015 | 12/1980 | White | 318/338 |
| 4,403,177 | 9/1983 | Weber et al. | 318/254 |
| 4,431,953 | 2/1984 | Schray et al. | 318/254 |
| 4,455,514 | 6/1984 | Ohno | 318/254 |
| 4,473,781 | 9/1984 | Nielsen | 318/254 |
| 4,514,666 | 4/1985 | Suzuki | 318/293 |
| 4,544,868 | 10/1985 | Murty | 318/254 |
| 4,631,458 | 12/1986 | Furuichi | 318/254 |
| 4,642,537 | 2/1987 | Young | 318/254 |
| 4,654,566 | 3/1987 | Erdman | 318/254 |
| 4,734,635 | 3/1988 | Kamikura et al. | 318/685 |
| 4,739,234 | 4/1988 | Nolan et al. | 318/504 |
| 4,740,734 | 4/1988 | Takeuchi et al. | 318/254 |
| 4,748,385 | 5/1988 | Van Hout | 318/254 |
| 4,752,724 | 6/1988 | Radziwill et al. | 318/254 |
| 4,761,599 | 8/1988 | Yasunobu et al. | 318/723 |
| 4,792,739 | 12/1988 | Nakamura et al. | 318/661 |
| 4,827,196 | 5/1989 | Odell | 318/254 |
| 4,833,375 | 5/1989 | Del Signore, II | 318/269 |
| 4,853,604 | 8/1989 | McMullin et al. | 318/653 |
| 4,874,993 | 10/1989 | Tanaka et al. | 318/254 |
| 4,952,853 | 8/1990 | Archer | 318/254 |
| 5,017,845 | 5/1991 | Carobolante et al. | 318/138 |
| 5,023,527 | 6/1991 | Erdman et al. | 318/254 |
| 5,119,000 | 6/1992 | Schultz | 318/254 |
| 5,187,417 | 2/1993 | Minnich et al. | 318/254 |
| 5,220,259 | 6/1993 | Werner et al. | 318/432 |
| 5,223,771 | 6/1993 | Chari | 318/254 |
| 5,231,343 | 7/1993 | Nakamura | 318/696 |
| 5,300,866 | 4/1994 | Yasohara et al. | 318/254 |
| 5,319,289 | 6/1994 | Austin et al. | 318/254 |
| 5,350,988 | 9/1994 | Le | 318/618 |
| 5,376,870 | 12/1994 | Ueda et al. | 318/603 |
| 5,378,976 | 1/1995 | Inaji et al. | 318/810 |
| 5,406,150 | 4/1995 | Austin | 327/110 |
| 5,517,095 | 5/1996 | Carobolante et al. | 318/254 |

OTHER PUBLICATIONS

"Microcomputer Control for Sensorless Brushless Motor", Kenichi Iizuka, et al., IEEE Transactions on Industry Applications, vol. 1A–21, No. 4, pp. 595–601, May/Jun. 1985.

*Primary Examiner*—Karen Masih
*Attorney, Agent, or Firm*—Weingarten, Schurgin, Gagnebin & Hayes LLP

[57] ABSTRACT

A brushless DC motor controller including a track and hold circuit responsive to the voltage at the motor centertap terminal and the voltage across at least one motor winding in order to determine the position of the rotor by detecting zero crossings of the back EMF of the unenergized winding in a manner having reduced susceptibility to noise. In one embodiment, the output of the track and hold circuit is interpolated to reduce the effects of pulse width modulation noise on rotor position detection. The drive signals controlling a plurality of electronically controlled switches which effect energization of the windings are chopped in order to control the speed of the motor. In one embodiment, the switch connected to a positive voltage is chopped when the sensed back EMF is positive and the switch connected to the negative voltage is chopped when the sensed back EMF is negative. Also provided is a PWM disable circuit for selectively disabling a PWM signal used to chop the drive signals in order to further reduce the effects of noise on rotor position detection.

24 Claims, 5 Drawing Sheets

BRUSHLESS DC MOTOR CONTROLLER

This application is a continuation of application Application Ser. No. 08/542,806, filed Oct. 13, 1995, now abandoned.

FIELD OF THE INVENTION

This invention relates generally to brushless DC motor controllers and more particularly, to a DC motor controller having enhanced rotor position detection and rotor control circuitry.

BACKGROUND OF THE INVENTION

As is known in the field of brushless DC motor controllers, rather complex electronic circuits are generally required to rotate the rotor by energizing and de-energizing the armature coils, or windings associated with the stator of the motor in sequence and with a particular time relationship (a process referred to generally as commutation). In conventional three-phase brushless DC motors, two windings are driven by being selectively connected to a positive or negative supply voltage via a respective pair of electronically controlled switches and a third winding is unenergized, or floating. As the rotor rotates relative to the stator, a voltage is induced in the motor windings, which is referred to as back electromotive force (i.e., back EMF).

Various techniques are employed for sensing the position of the rotor for purposes of commutation. In one such technique, the back EMF associated with the unenergized motor winding is measured to provide an indication of the rotor position. The back EMF of the unenergized winding is often sensed with the use of low pass filters and/or integrators. However, these circuits tend to be complex, sensitive to component values and relatively slow.

It is often necessary to provide a mechanism for regulating the current through the energized motor windings in order to regulate motor speed or torque. One way of regulating motor current is by pulse-width-modulating (PWM), or chopping, the drive signals which control the electronically controlled switches associated with the driven windings. In accordance with one such chopping scheme, either the driven switch connected to the negative voltage is always the chopped switch or the driven switch connected to the positive voltage is always the chopped switch.

In accordance with another chopping scheme, the switches of each switch pair associated with the driven windings are alternately chopped. This arrangement advantageously maintains the average voltage at the centertap terminal of the motor at one-half the supply voltage level. While these techniques are relatively efficient, both tend to be rather susceptible to noise. In order to reduce the resulting noise coupled to other circuits, the motor drive signals are often slew-rate limited and/or low-pass filtered using inductors, capacitors and/or resistors which adds to the cost and complexity of the circuit.

SUMMARY OF THE INVENTION

In accordance with the invention, a brushless DC motor controller is provided with enhanced accuracy rotor position detection circuitry and motor control circuitry. The controller includes a track and hold circuit for sensing the rotor position in a manner that has reduced susceptibility to noise, a chopping arrangement whereby the voltage across the floating winding is prevented from exceeding the supply voltage level and a PWM disabling circuit which further reduces the effects of noise on rotor position detection. In one embodiment, interpolation circuitry is provided for reducing the effect of PWM noise on commutation.

More particularly, a DC motor controller for controlling a plurality of electronically controlled switches which sequentially energize the windings of a motor in response to a corresponding plurality of drive signals is provided with a track and hold circuit. The track and hold circuit tracks and holds the voltage across one of the windings and compares such voltage to a reference voltage by a zero crossing comparator which provides an output signal indicative of when the voltage across the sensed winding crosses the reference voltage. A decoder is responsive to the output signal of the zero crossing comparator and provides the plurality of drive signals for commutating the motor.

In one embodiment, the track and hold circuit includes an electronically controlled switch connected in series with a resistor and a capacitor connected between the switch and a reference potential. Also provided is interpolation circuitry for interpolating the tracked and held winding voltage by selectively sourcing or sinking current to or from the track and hold capacitor. In this way, the interpolation circuitry smoothes the tracked and held voltage waveform during the time when the sensed winding voltage is being held, thereby enhancing the accuracy of the zero crossing detection.

Also described is a method for sensing the position of a rotor including the steps of tracking the voltage across a selected motor winding, holding the winding voltage and comparing the held winding voltage to a reference voltage in order to detect when the winding voltage crosses the reference voltage. The method further includes the steps of tracking the voltage at the centertap terminal of the motor, holding the centertap voltage to provide the reference voltage and comparing the held centertap voltage to the held winding voltage to detect the crossings of the winding voltage with the centertap voltage.

The use of the track and hold circuit to sense the voltage across the floating winding advantageously serves to reduce the effects of noise associated with pulse width modulation. More particularly, the relatively large voltage swings impressed on the floating winding due to the chopping are prevented from impacting the rotor position detection by opening the track and hold switch. This is because the track and hold capacitor and zero crossing comparator are effectively decoupled from the floating winding during such hold intervals.

In accordance with a further aspect of the invention, a DC motor controller is provided for controlling a motor having a plurality of windings and a plurality of switching circuits, each associated with a respective winding and comprising a first switch connected to a positive voltage supply terminal (the high side switch) and a second switch connected to a negative voltage supply terminal (the low side switch). The motor controller includes a back EMF sensing circuit for sensing the back EMF across at least one winding. A decoder, responsive to the sensed back EMF, generates drive signals to control the switches such that the high side switch associated with the winding energized with a positive voltage is chopped when the sensed back EMF is positive and the low side switch associated with the winding energized with a negative voltage is chopped when the sensed back EMF is negative. Also described is a method for commutating a motor including the steps of sensing the back EMF across a first winding, chopping a high side switch associated with the winding energized with a positive voltage when the sensed back EMF is positive and chopping a low side switch associated with the winding energized with a negative voltage when the sensed back EMF is negative.

With this chopping arrangement, the average voltage at the centertap terminal of the motor is maintained at approximately one-half of the supply voltage level. Moreover, this chopping scheme prevents the voltage swings across the floating winding from exceeding the supply voltage rails and thus inducing current into the floating winding. This arrangement is desirable because energy stored in the floating winding as a result of voltage swings attributable to chopping must be permitted to dissipate in order to accurately sense the back EMF of the winding. Since such dissipation takes time, the more energy stored in the floating winding, the longer the dissipation interval and therefore, the longer the voltage must be held by the track and hold circuit. The present chopping arrangement eliminates the time necessary to dissipate energy in the floating winding by limiting the voltage swing across the floating winding.

In accordance with a further embodiment of the invention, a DC motor controller controls a switch network which sequentially energizes the motor windings in response to respective drive signals and includes a rotor position sensing circuit for sensing when the voltage across one of the windings crosses a reference voltage level (i.e., experiences a zero crossing) and a speed sensing circuit for sensing the speed of rotation of the motor to provide a measured speed signal. The controller further includes a PWM circuit responsive to the measured speed signal for generating a speed error signal indicative of the difference between the measured and desired motor speeds and for generating a PWM signal used to selectively chop the drive signals to regulate the motor speed. Also provided is a PWM disable circuit for disabling the PWM signal before and during the zero crossings of the winding voltage. In one embodiment, the PWM disable circuit includes a buffer amplifier responsive to the centertap voltage and an offset voltage summed with an output signal of the buffer amplifier. A comparator compares the summed voltage with the sensed winding voltage and provides a gating signal for inhibiting the PWM signal in the vicinity of the zero crossings of the sensed winding voltage.

Also described is a method of sensing the position of the rotor in order to commutate the rotor through a switch network including a plurality of switches controlled by a corresponding plurality of drive signals. The method includes the steps of sensing when the back EMF across at least one of the windings experiences a zero crossing by crossing a reference voltage level, sensing the speed of rotation of the motor and generating a PWM signal in response to the sensed motor speed and generating the drive signals in response to the PWM signal. The PWM signal is inhibited for an interval prior to and during the zero crossings of the winding voltage. By inhibiting the PWM signal in the vicinity of the zero crossings, the effect of chopping by the PWM signal on the sensed winding voltage and thus, also on the rotor position detection, is reduced.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENT

Figure 1:
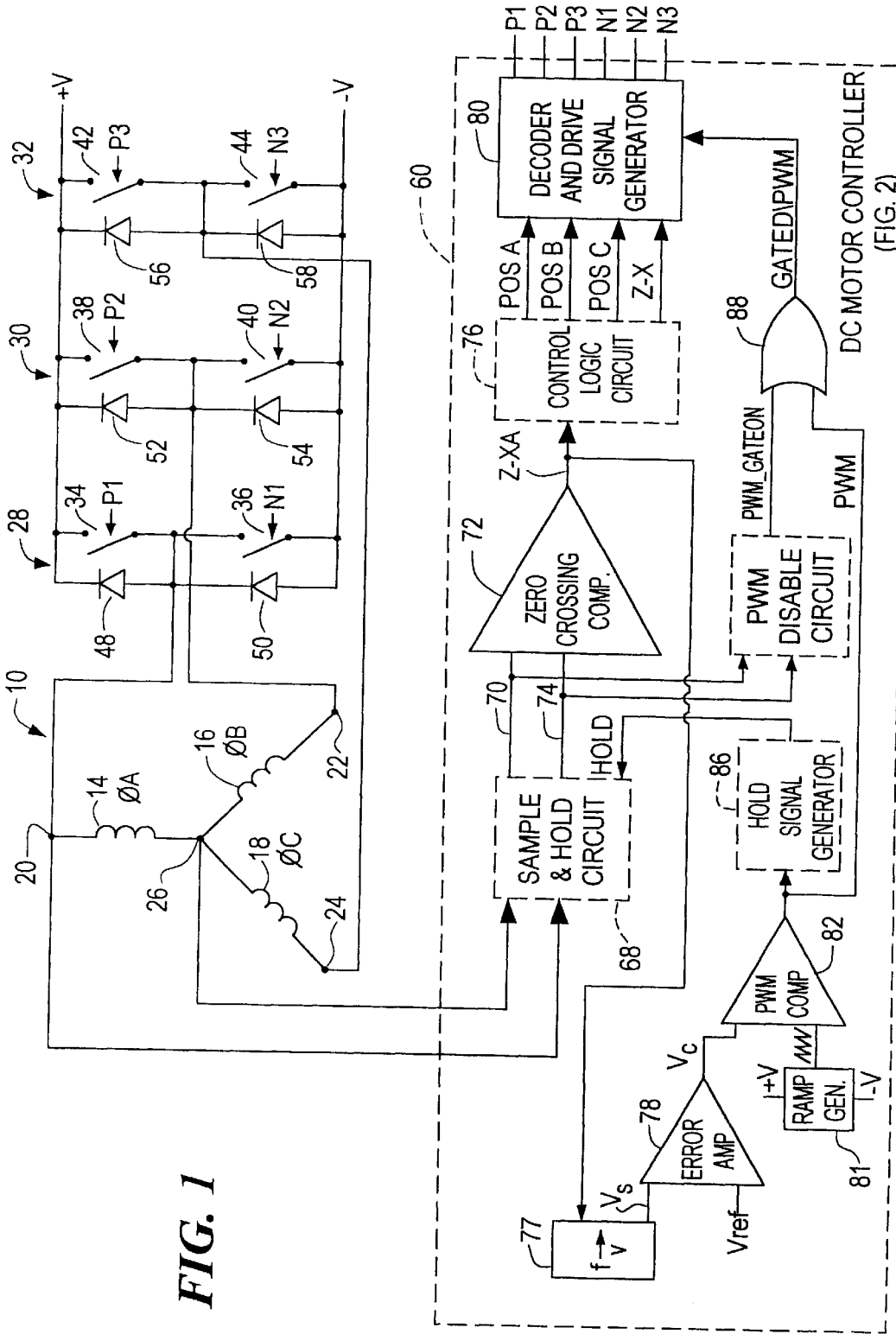
FIG. 1 is a block diagram of a brushless DC motor and by a DC motor controller in accordance with the invention.

Referring to FIG. 1, an illustrative brushless DC motor 10 is shown to have three armature coils, or windings 14, 16 and 18 with respective terminals 20, 22 and 24 and a centertap terminal 26. As is well known, the windings 14, 16, and 18 are associated with a stator of the motor and a rotor connected to a load (not shown) is made to rotate relative to the stator by selectively and sequentially energizing the stator windings 14, 16 and 18. To this end, a plurality of switching circuits 28, 30 and 32 are provided for energizing corresponding motor windings 14, 16 and 18, respectively.

Each switching circuit 28, 30 and 32 includes a pair of electronically controlled switches 34 and 36, 38 and 40, and 42 and 44 connected between the positive terminal V+ and negative terminal V− of a voltage supply. The switches 34, 38 and 42 of each circuit 28, 30 and 32 connected to the positive voltage supply terminal are referred to herein as high side switches and the switches 36, 40 and 44 connected to the negative voltage supply terminal are referred to herein as low side switches. In one embodiment, the switches 34–44 are field effect transistors, having a respective drive signal P1, N1–P3, N3 coupled to the gate terminal thereof. The interconnection between each pair of switches 34 and 36, 38 and 40, and 42 and 44 is connected to the respective winding terminal 20, 22 and 24. Drive signals P1, N1, P2, N2 and P3, N3 are generated to sequentially control the conduction of switches 34–44, respectively, in a predetermined time relationship (i.e., to commutate the motor). Each of the switching circuits 28, 30 and 32 additionally includes a pair of diodes 48 and 50, 52 and 54, and 56 and 58 which are operative to direct current from the respective winding to the voltage supply.

Also shown in FIG. 1 is a brushless DC motor controller 60 in accordance with the invention. The motor controller 60 generates the drive signals P1, N1–P3, N3 in order to control the selective energization of the motor windings 14, 16, 18 so as to rotate the rotor within the stator. To this end, the motor controller 60 is responsive to the voltage across at least one of the windings (such as illustrative winding 14) for generating the drive signals P1, N1–P3, N3 in a manner which causes rotation of the rotor. More specifically, the present position of the rotor (and thus also the desired next position of the rotor) is determined by detecting when the back EMF across at least one of the windings 14 crosses a reference voltage level.

In the illustrative embodiment, the motor 10 is a constant speed motor. The speed of the motor is maintained constant by pulse-width-modulation (PWM) circuitry with which the drive signals P1, N1–P3, N3 are pulse-width-modulated, or chopped. The particular manner of chopping the drive signals implemented herein advantageously prevents the voltage across the floating winding from exceeding the supply voltage level, as will be described below. It will be appreciated however that the PWM circuitry may be responsive to motor parameters other than motor speed as in the case of the constant speed motor of the illustrative embodiment. For example, the PWM circuitry may be responsive to motor torque, acceleration or other parameters.

Because the motor 10 is a constant speed motor, the reference crossings (referred to alternatively herein as zero crossings) associated with each of the windings are equidistantly spaced with respect to one another. As a result, in the illustrative embodiment, the motor controller 60 is responsive only to the voltage across one winding 14. By detecting the zero crossings associated with winding 14, the zero crossings associated with the other windings 16, 18 are determined by a counter within a control logic circuit 76, as will be described. It will be appreciated by those of skill in the art however that the motor controller 60 may be readily adapted to sense the zero crossings associated with either of the other windings 16 and 18, or some combination of the three windings 14, 16 and 18.

Preferably, the motor controller 60 is implemented on an integrated circuit. However, it will be appreciated that any of the motor controller components may alternatively be discrete components, located external to other integrated circuit components of the controller. Alternatively still, the entire motor controller may be discretely implemented.

The motor controller 60 includes a track and hold circuit 68 which tracks the voltage across winding 14 and holds such voltage under the control of a HOLD signal. The track and hold circuit 68 additionally tracks the voltage at the motor centertap terminal 26 and holds such voltage under the control of the HOLD signal. The tracked and held version of the voltage across winding 14 is provided on a signal line 70 to an input of a zero crossing comparator 72 and to a PWM disable circuit 84. The tracked and held centertap voltage is provided on signal line 74 to an input of the zero crossing comparator 72 and to the PWM disable circuit 84. In one embodiment, the track and hold circuit 68 includes interpolation circuitry for interpolating the tracked and held winding voltage, in order to enhance the accuracy of the rotor position detection, as will be described further in conjunction with FIG. 2. Use of the track and hold circuit 68 advantageously serves to detect the rotor position while also reducing the effect of PWM noise on the rotor position detection, as will be discussed.

Figure 2:
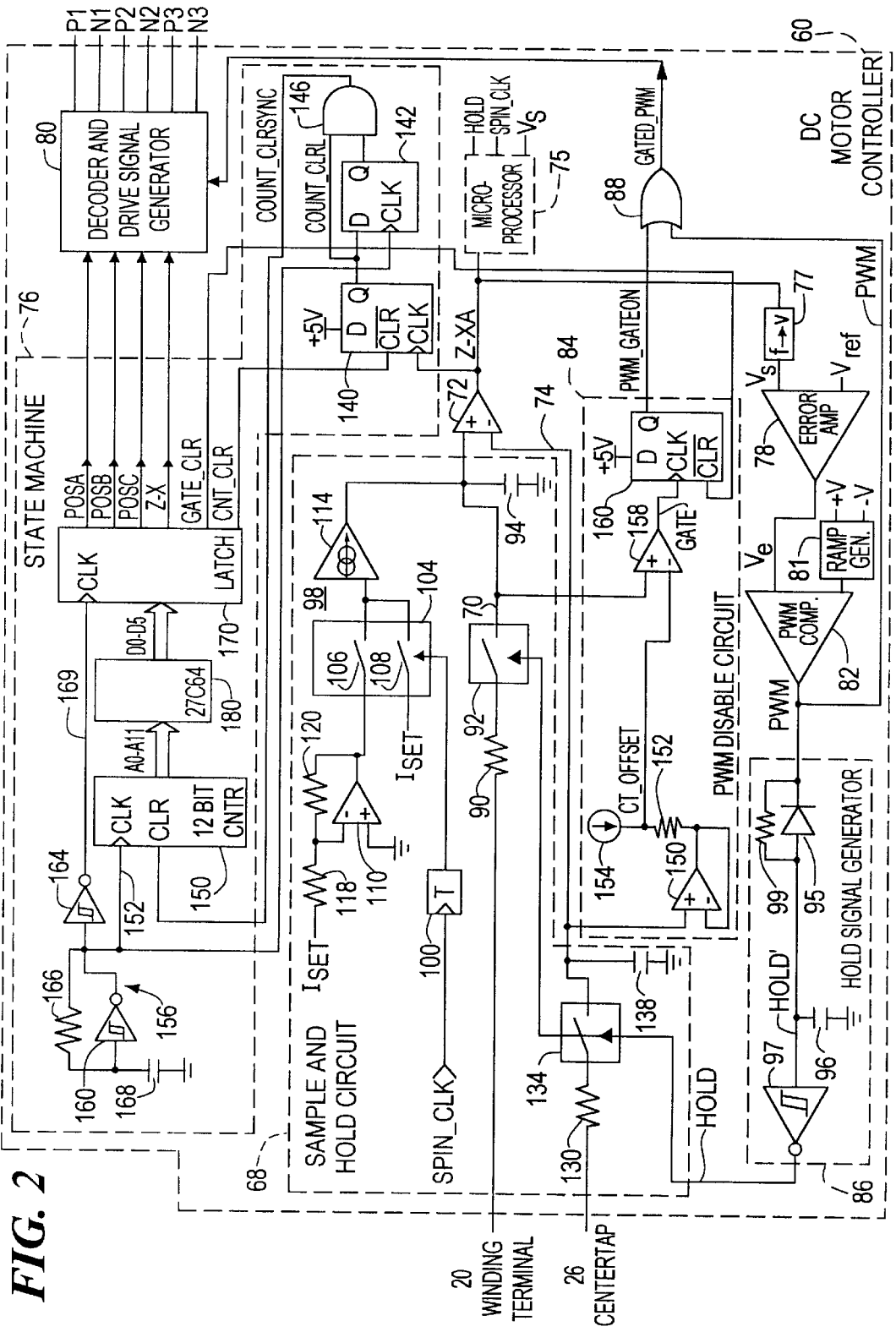
FIG. 2 is a schematic of the DC motor controller of FIG. 1.

The zero crossing comparator 72 detects when the voltage across winding 14 crosses the voltage at the centertap terminal 26. The zero crossing output signal Z-XA of comparator 72 provides an indication of the present position of the rotor, so as to enable the "next position" drive signals P1, N1–P3, N3 to be generated to effect rotation of the rotor. More particularly, the zero crossing output signal Z-XA is coupled to the control logic circuit 76 which generates position signals POSA, POSB, POSC, which are indicative of the current rotor position. The control logic circuit 76 may be a state machine, as shown in the embodiment of FIG. 2, or may alternatively be a microcontroller or other suitable type of control logic circuit. As will become further apparent by reference to the position signals shown in FIG. 6 below, in a given cycle of rotor rotation, the POSA, POSB, POSC position signals define six states of conduction of switches 34–44. The control logic circuit 76 additionally generates a Z-X signal which is coupled to the decoder and drive signal generator 80 for determining when a transition is made from chopping a low side switch to a high side switch in accordance with the chopping scheme described below in conjunction with FIGS. 7 and 8.

A decoder and drive signal generator 80 is responsive to the position signals POSA, POSB and POSC, a GATED_PWM signal and a Z-X signal provided by the control logic circuit 76 for generating the drive signals P1, N1–P3, N3. More particularly, the circuit 80 decodes position signals POSA, POSB and POSC into respective transistor drive signals P1, N1, P2, N2 and P3, N3, respectively, and the GATED_PWM signal modulates the appropriate ones of such signals to provide the drive signals with a duty cycle necessary to maintain the motor speed constant, since the average voltage applied to the motor is proportional to motor speed.

More particularly, at any given time during rotor rotation, one of the switches of each switching circuit 28, 30 and 32 associated with a driven winding is chopped in accordance with the GATED_PWM signal. In the present invention, the high side switch 34, 38, 42 associated with the driven windings 14, 16 and 18 are chopped when the sensed back EMF associated with the unenergized winding is positive and, when the sensed back EMF is negative, the low side switch 36, 40, 44 associated with the driven windings 14, 16 and 18 are chopped. With this arrangement, the average centertap voltage is maintained at one-half of the level supply voltage. Additionally, the voltage across the unenergized winding is prevented from exceeding the supply voltage level. This result is advantageous in order to reduce the delay associated with sensing the back EMF of the floating winding, as will be described below.

The zero crossing output signal Z-XA of comparator 72 is additionally provided to a frequency to voltage converter 77 which converts the frequency of zero crossings detected by the zero crossing comparator 72 into an analog voltage proportional to such frequency (i.e., the speed feedback signal $V_s$). The analog voltage thus generated is compared to a reference voltage $V_{ref}$ by an error amplifier 78 to provide a speed error signal $V_e$ indicative of the error between the actual motor speed, as sensed by the zero crossing comparator 72, and the desired, constant motor speed. A PWM comparator 82 compares the speed error signal $V_e$ to a sawtooth waveform generated by a ramp generator 81. The output signal of the PWM comparator 82 is a PWM signal which is a pulse train having a duty cycle that varies in accordance with the duty cycle of conduction of the switches 34–44 necessary to maintain the speed of the motor constant. In a preferred embodiment, the PWM comparator implements a feed forward feature, whereby the ramp generator 81 is responsive to the supply voltage for varying the amplitude and slope of the sawtooth waveform in accordance with variations in the supply voltage. With this arrangement, variations in the supply voltage are prevented from affecting the speed of the motor.

The output of the PWM comparator 82 is coupled to a HOLD signal generator 86, as well as to an OR gate 88. The HOLD signal generator 86 generates the HOLD signal which controls the track and hold circuit 68 in a manner discussed further below in conjunction with FIGS. 2 and 3. The OR gate 88 is responsive to the PWM signal and to a PWM_GATEON signal provided by the PWM disable circuit 84 for generating the GATED_PWM signal with which the decoder and drive signal generator 80 modulates the drive signals P1, N1–P3, N3.

More particularly, a PWM disable feature is implemented by the PWM disable circuit 84 which is responsive to the voltage across sensed winding 14 on line 70 and to the voltage at the centertap terminal 26 on line 74 and generates the PWM_GATEON signal. The PWM_GATEON signal transitions from a logic low level to a logic high level at a predetermined interval before a zero crossing of the back EMF of the sensed winding 14 occurs and remains high until the zero crossing occurs. The PWM_GATEON signal is coupled to a first input of OR gate 88, a second input to which is provided by the PWM signal. The PWM_GATEON signal serves to "gate" or "blank" the PWM signal off during the predetermined interval prior to and during the zero crossing of the winding 14, during which the PWM_GATEON signal is high. The GATED_PWM signal is coupled to the decoder and drive signal generator 80 for generation of drive signals P1, N1–P3, N3. With this arrangement, the chopping of the appropriate driven winding switches is interrupted during the predetermined interval prior to and during detected zero crossings, so as to reduce the effect of noise attributable to chopping on the zero crossing detection.

Referring also to FIG. 2, a schematic of the motor controller 60 is shown to include the track and hold circuit 68, the PWM disable circuit 84, OR gate 88, the control logic circuit 76 and the decoder and drive signal generator 80. As noted above, in the illustrative embodiment, the control logic circuit 76 is a state machine 76. The track and hold circuit 68 includes a resistor 90 coupled between winding terminal 20 and a switch 92. A capacitor 94 is connected between the switch 92 and ground, as shown. The interconnection between the capacitor 94 and switch 92 is further connected to the non-inverting input terminal of the zero crossing comparator 72 via signal line 70.

Also provided in track and hold circuit 68 is a resistor 130 connected between the motor centertap terminal 26 and a switch 134. Switch 134 is further connected to a capacitor 138 and to the inverting input terminal of the zero crossing comparator 72 via signal line 74. Switches 92 and 134 are both controlled by the HOLD signal which is generated by the HOLD signal generator 86.

The zero crossing comparator 72 receives the voltage across track and hold capacitor 94 at a non-inverting input terminal thereof and further receives the voltage across capacitor 138 at its inverting input terminal. The zero crossing comparator 72 thus compares the back EMF voltage across capacitor 94 to the centertap voltage across capacitor 138 to provide the zero crossing output signal Z-XA.

The output signal Z-XA of the zero crossing comparator 72 provides a clock signal for a flip-flop 140 of the state machine 76 and also provides an input to the frequency to voltage converter 77 which converts the frequency of the zero crossing detections to an analog voltage proportional to such frequency (i.e., the speed feedback signal $V_S$) and representative of the actual speed of the motor. It will be appreciated however that various techniques are possible for generating the speed feedback signal $V_S$, such as the use of an optional microprocessor 75 responsive to the zero crossing signal Z-XA. In one embodiment, an optional microprocessor 75 additionally generates the HOLD signal which controls the track and hold circuit 68 and a SPIN_CLK signal used in interpolation circuitry 98 within the track and hold circuit 68, as described below.

The output signal $V_S$ of the frequency to voltage converter 77 is provided to error amplifier 78, the output of which provides the speed error signal $V_e$ indicative of the difference between the actual and desired motor speeds. The speed error signal is coupled to a first input of the PWM comparator 82, a second input to which receives a sawtooth waveform from a ramp generator 81 implementing a voltage feedforward feature, as described above. The PWM signal at the output of comparator 82 is coupled to the HOLD signal generator 86, as well as to an input to the OR gate 88.

The PWM disable circuit 84 disables the PWM signal for a short predetermined interval prior to and during sensed zero crossings. This PWM disable feature is implemented by comparing the voltage across the sensed winding 14 with the sum of the motor centertap voltage and an offset voltage (i.e., the CT_OFFSET signal). More particularly, the centertap sampling capacitor 138 is connected to a non-inverting input terminal of a buffer amplifier 150, the inverting input terminal to which is fed back from the buffer amplifier's output terminal. The output terminal of the buffer amplifier 150 is further connected to a series resistor 152 and a current source 154, the interconnection between which provides the CT_OFFSET signal to the inverting input terminal of a gating comparator 158. The non-inverting input terminal to the gating comparator 158 is connected to signal line 70.

The magnitude of the offset provided by the current source 154 determines the length of the interval prior to a zero crossing that the PWM signal will be inhibited. The output of the gating comparator 158 is coupled to a clock input of a gating flip-flop 160, the Q output of which provides the PWM_GATEON signal to OR gate 88. The flip-flop 160 is reset by a GATE_CLR signal provided by the state machine 76, such that each time a zero crossing on winding 14 is detected, the flip-flop 160 is cleared. In this way, the duration during which the PWM signal is inhibited is minimized, thereby achieving the noise reduction advantage of inhibiting the PWM pulse during the sensed zero crossings while maintaining accurate control of the motor speed.

Figure 3:
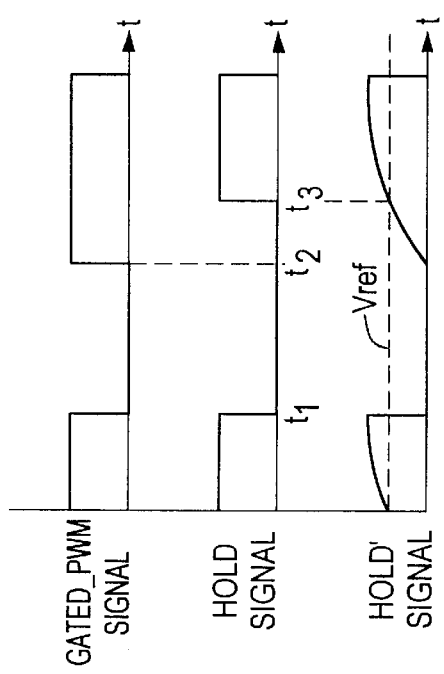
FIG. 3 is a timing diagram showing the PWM signal, the HOLD signal and an intermediate HOLD' signal generated by the HOLD signal generator of FIG. 2.

Referring briefly also to FIG. 3, the first two waveforms shown therein correspond to a portion the GATED_PWM signal and the HOLD signal. A third signal HOLD' shown in FIG. 3 will be discussed below in conjunction with the HOLD signal generator 86 of FIG. 2. During a first time interval, the driven windings are energized and the switches 92 and 134 are closed by the HOLD signal being high. Thus, capacitor 94 is charged to and "tracks" the back EMF associated with winding 14 and capacitor 138 is charged to and tracks the voltage at the centertap terminal 26. Also during this first interval, the GATED_PWM signal is high indicating that the appropriate switches 34–44 associated with the driven windings are conducting (i.e., the PWM signal is not inhibited).

At time $t_1$, the GATED_PWM signal goes low to effect the necessary duty cycle for the switches 34–44 associated with the driven windings so as to maintain the motor speed constant. Once power to the energized windings is interrupted at time $t_1$, the HOLD signal also goes low to open switches 92 and 134. With switches 92 and 134 open, the voltages across capacitors 94 and 138 remain constant and the capacitors are effectively de-coupled from the floating winding 14. Thus, the effect of any noise caused by voltage swings on the floating winding during this interval on the detection of the rotor position is reduced.

At time $t_2$, the GATED_PWM signal goes high and the driven windings are again energized. However, the HOLD signal remains low, keeping switches 92 and 134 open until a time $t_3$, after a predetermined delay $t_3-t_2$ has lapsed. By keeping the switches 92 and 134 open when the driven windings are re-energized at time $t_2$, the impact of any noise associated with re-energization of the driven windings on the sensed zero crossings is reduced. This delay can also be used in order to permit energy in the sensed winding 14 to dissipate before tracking its back EMF again. More particularly, conventional chopping associated with the energized windings causes voltage swings to be imposed on the floating winding. Such voltage swings on the floating winding cause some energy to be stored in the winding and further cause the corresponding free-wheeling diodes 48, 50 to conduct current back to the voltage source. Since this energy must be dissipated before the voltage across the floating winding 14 can be accurately tracked, the delay between $t_3-t_2$ may be used to extend the hold time. Preferably however, in accordance with the chopping scheme described herein, energy is prevented from being stored in the floating winding, thereby eliminating the need to dissipate such energy.

Figure 4:
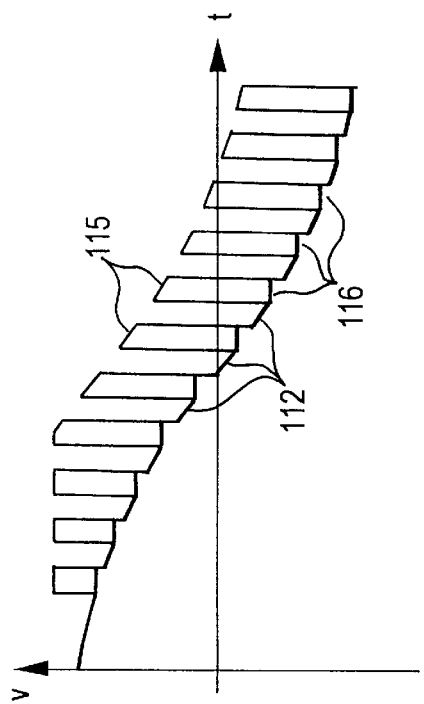
FIG. 4 shows the voltage waveform across a floating winding and a tracked and held version of such winding voltage.
Figure 8:
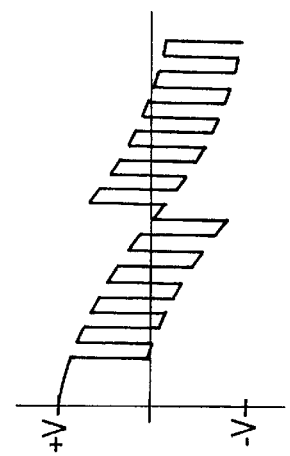
FIG. 8 shows the voltage waveform across a floating winding of the motor of FIG. 1 when the alternating chopping scheme is utilized.

Referring now also to FIG. 4, the voltage 115 impressed on the winding 14 when it is the floating winding is shown to have voltage swings caused by the chopping of the energized windings. Note that the voltage across winding 14 shown in FIGS. 4 and 5 does not represent the voltage waveforms with the alternating chopping scheme implemented. When the alternating chopping scheme is implemented, the voltage across the floating winding 14 is as shown in FIG. 8 below. The tracked and held voltage across the unenergized winding 14 (i.e., on signal line 70) when the interpolation circuitry 98 of the track and hold circuit 68 is not in use, is shown in FIG. 4 in bold. As is apparent from FIG. 4, the voltage across capacitor 94 has a staircase appearance in that, during intervals (labelled 112) when the switch 92 is closed and the voltage across the capacitor 94 tracks the voltage across winding 14, the tracked voltage decays. Whereas, during intervals (labelled 116) when the switch 92 is open, the voltage across capacitor 94 remains constant.

The interpolation circuitry 98 of the track and hold circuit 68 (FIG. 2) serves to interpolate the tracked and held voltage across capacitor 94. The interpolation circuitry 98 includes a toggle latch 100 responsive to a SPIN_CLK signal and which provides an output signal for controlling a dual pole, single throw switch circuit 104. A first one 106 of the switches is connected between the output terminal of an operational amplifier 110 and an input of a current source/sink 114. A second one 108 of the switches is responsive to an $I_{SET}$ signal and is further connected the input terminal of the current source/sink 114. The amplifier 110 has an inverting input terminal coupled to a first resistor 118 which is further connected to the $I_{SET}$ signal and to a second resistor 120 which is further connected to the output terminal of the amplifier. A non-inverting input terminal of amplifier 110 is connected to ground.

In operation, the interpolation circuitry 98 serves to smooth the tracked and held back EMF waveform, particularly during the time when the sensed winding voltage is being held. To this end, during portions of rotor rotation when the back EMF of winding 14 is falling, the output of toggle latch 100 causes switch 106 to be closed and switch 108 to be opened. This arrangement causes current source/sink 114 to operate as a current sink, so as to remove a small predetermined amount of current from the capacitor 94. The result of such current sinking on the tracked and held voltage across capacitor 94 is shown in bold in FIG. 5. The amount of current removed by the current sink 114 is set by the $I_{SET}$ signal, based on parameters such as motor speed, the number of poles of the motor and the voltage applied to the motor.

Figure 5:
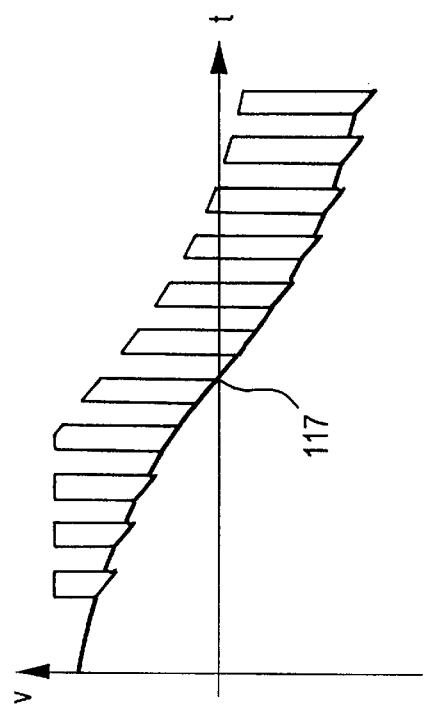
FIG. 5 shows the tracked and held version of the floating winding voltage of FIG. 4 after such voltage has been interpolated.

The $I_{SET}$ signal is selected to provide the best interpolation (i.e., the smoothest waveform) in the region of the zero crossings, labelled 117 in FIG. 5.

During intervals when the back EMF of winding 14 is rising, the SPIN_CLK signal causes the toggle latch 100 to close switch 108 and open switch 106. During these intervals, and with switch 108 closed, the current source/sink 114 operates as a current source. With current source 114 supplying a small predetermined amount of current to capacitor 94 based on the $I_{SET}$ signal, the otherwise falling staircase-like voltage across capacitor 94 is smoothed in the region of the zero crossings.

Various implementations for generating the HOLD signal are possible, including the use of optional microprocessor 75. In the illustrative embodiment, the HOLD signal generator 86 includes a diode 95 having a cathode connected to the output of the PWM comparator 82, an anode connected to a capacitor 96 and to the input terminal of a Schmitt trigger 97, with the diode being connected in parallel with a resistor 99. A HOLD' signal is coupled to the input terminal of the Schmitt trigger 97. The capacitor 96 is further connected to ground and the output terminal of the Schmitt trigger 97 provides the HOLD signal.

The operation of the HOLD signal generator 86 will be described in conjunction with FIGS. 2 and 3. FIG. 3 shows a HOLD' signal which is coupled to the input of the Schmitt trigger 97, as shown in FIG. 2. In the interval of operation shown in FIG. 3, the GATED_PWM signal is identical to the PWM signal (i.e., the interval just prior to a zero crossing is not shown). On the positive going transitions of the GATED_PWM signal, the HOLD' signal at the input of the Schmitt trigger 97 rises exponentially in accordance with a time constant established by resistor 99 and capacitor 96. The negative going transitions of the GATED_PWM signal cause the HOLD' signal to simultaneously transition to a low level. Also shown in relation to the HOLD' signal in FIG. 3 is a reference voltage $V_{ref}$. The Schmitt trigger 97 compares the reference voltage $V_{ref}$ to the HOLD' signal to generate the HOLD signal, such that the HOLD signal transitions to a logic high level when the positive going edge of the HOLD' signal crosses the $V_{ref}$ voltage and transitions to a low level when the negative going edge crosses the $V_{ref}$ voltage.

As noted above, the zero crossing signal Z-XA at the output of comparator 72 is also provided to a flip-flop 140 of the state machine 76. The Q output of flip-flop 140 (i.e., the COUNT_CLRL signal) is a five volt pulse clocked in accordance with the Z-XA signal and is connected to a first input of an AND gate 146 and to the D input to a second flip-flop 142. The first flip-flop 140 provides the COUNT_CLRL signal in response to which a COUNT_CLRSYNC signal is generated by AND gate 146 to clear a counter 150 within the state machine 76. The second flip-flop 142 has a Q output which is connected to the second input to the AND gate 146. The second flip-flop 142 serves to synchronize the COUNT_CLRSYNC signal to the clock signal 152 associated with the state machine counter 150. The counter clock signal 152 associated with the state machine counter 150 is provided by a Schmitt trigger oscillator circuit 156 which includes an inverter 160 connected in parallel with a resistor 166 and having an input terminal connected to a first terminal of a capacitor 168, the second terminal of which is connected to ground. A second inverter 164 inverts the clock signal 152 to provide a clock signal on line 169 for a latch 170.

As noted above, because the motor 10 is a constant speed motor, the fixed interval between zero crossings associated with each of the windings 14, 16 and 18 is known. The counter 150 of the state machine 76 is reset by the COUNT_CLRSYNC signal each time a negative zero crossing of winding 14 is detected (i.e., a zero crossing when the voltage on the floating winding is decreasing). The twelve bit output of counter 150 is provided to an EEPROM 180, such as the illustrative National Semiconductor 27C64, which uses the counter output signal A0-A11 in order to generate output signals D0-D5 at the appropriate times relative to when each of the windings 14, 16, 18 is the floating winding. Output signals D0-D5 of the EEPROM 180 correspond to the position signals POSA, POSB, POSC, the Z-X signal, the GATE_CLR signal and the CNT_CLR signal provided at the output of latch 170, respectively. The position signals POSA, POSB and POSC provide a three bit input to the decoder and drive signal generator 80. The GATE_CLR signal clears the PWM disable latch 160 when a zero crossing on winding 14 is detected and the CNT_CLR signal clears the latch 140 upon the occurrence of a zero crossing. The Z-X signal instructs the decoder and drive signal generator 80 when to switch from chopping a high side switch to a low side switch in accordance with the chopping scheme described below in conjunction with FIGS. 7 and 8.

Figure 6:
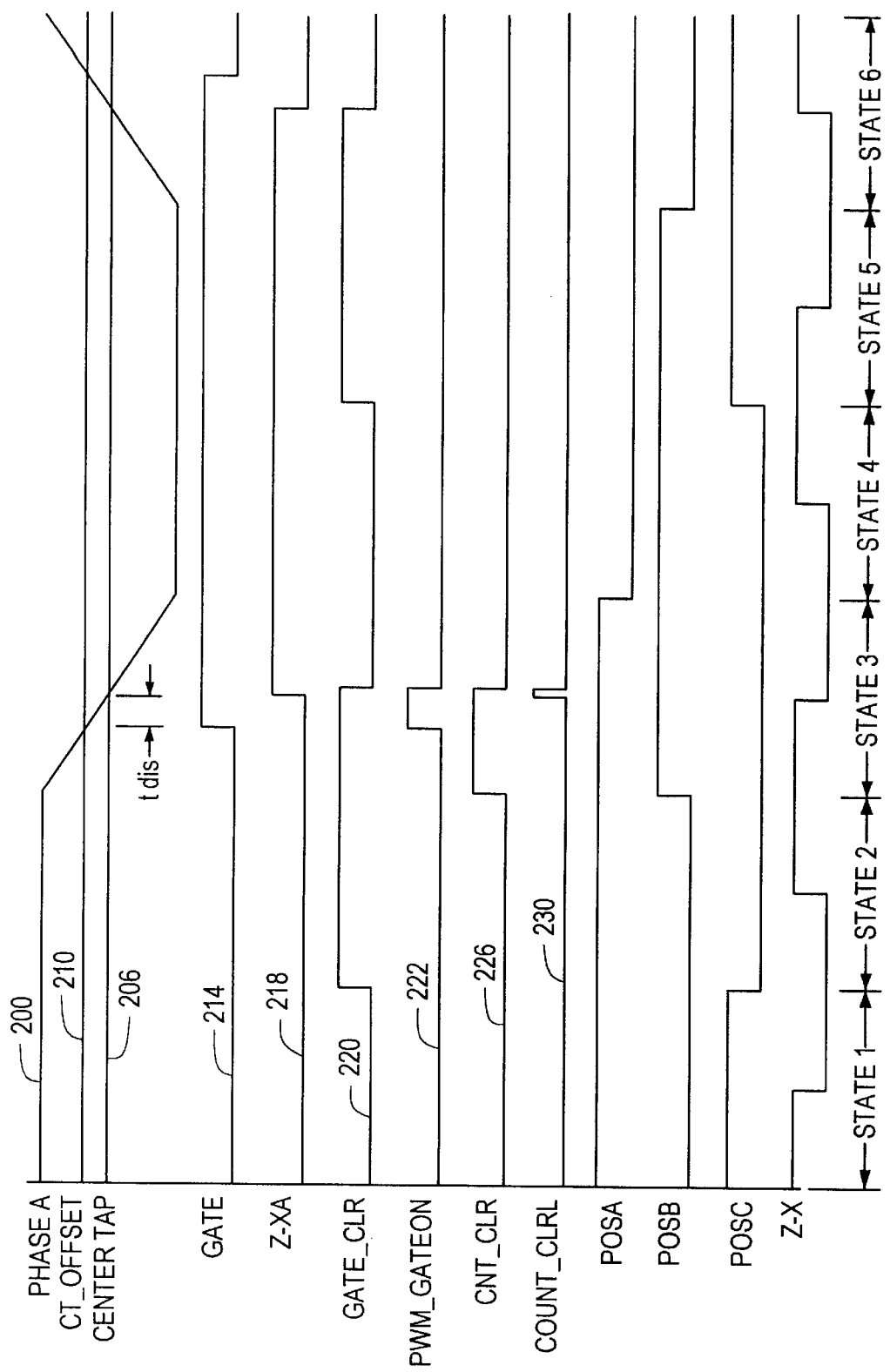
FIG. 6 is a timing diagram showing several signals associated with the DC motor controller of FIG. 2.

The way in which the EEPROM 180 operates to generate the position signals POSA, POSB and POSC, as well as the GATE_CLR and CNT_CLP signals, will be better understood by referring also to FIG. 6 which shows several signals associated with the motor controller 60 of FIG. 2. The back EMF of winding 14 is labelled 200, at the top of FIG. 6. As is apparent, for the first two states of a full motor rotation, winding 14 is energized and specifically, has a positive voltage applied to winding terminal 20 (i.e., winding 14 is positively energized). During the third and sixth states, winding 14 is unenergized, or floating. During states 4 and 5 of the illustrated motor rotation cycle, winding 14 is energized and specifically, a negative voltage is applied to winding terminal 20 (i.e., winding 14 is negatively energized). The centertap voltage 206 is shown in relation to the back EMF of winding 14. Also shown relative to the back EMF of winding 14 is the CT_OFFSET signal 210 at the inverting input terminal to the gating comparator 158 of the PWM disable circuit 84 (FIG. 2). As described above, the CT_OFFSET signal is compared to the voltage across winding 14 to provide the clock signal to the gating flip-flop 160. As will become apparent, the interval labelled $t_{dis}$ corresponds to that interval before and during a zero crossing, when the PWM signal is gated off by the PWM disable circuit 84.

Also shown in FIG. 6 is the GATE signal 214 which is provided at the output of the gating comparator 158 of the PWM disable circuit 84. The GATE signal 214 transitions to a logic high level, to clock the latch 160, when the voltage across winding 14 crosses the CT_OFFSET voltage 210, at the beginning of the interval $t_{dis}$. Below the GATE signal 214, the zero crossing signal Z-XA 218, at the output of the zero crossing comparator 72, is shown. The zero crossing signal Z-XA transitions to a logic high level when the voltage across winding 14 falls below the centertap voltage and transitions to a logic low level when the voltage across winding 14 exceeds the centertap voltage.

The GATE_CLR signal 220 is generated by the state machine 76 and transitions to a logic high level some time prior to each zero crossing. The GATE_CLR signal transitions to a logic low level when a zero crossing is detected, as shown. Since the gating flip-flop 160 is clocked by the rising edge of the GATE signal 214 and is cleared by the GATE_CLR signal's falling edge, the PWM_GATEON signal 222 rises upon the rising edge of the gate signal and falls upon the falling edge of the GATE_CLR signal, as shown, so as to be high during the $t_{dis}$ interval.

The CNT_CLR signal 226 is also generated by the state machine 76 and transitions to a logic high level some time prior to each zero crossing and remains high until a zero crossing is detected, as shown. Note that a short delay will occur between a zero crossing detection and the falling edge of the CNT_CLR signal due to the propagation delay associated with the zero crossing signal Z-XA being clocked through the state machine 76. Since the flip-flop 140 is clocked by the zero crossing signal 218 and is cleared by the CNT_CLR signal 226, the output of latch 140 (i.e., the COUNT_CLRL signal 230) transitions to a logic high level upon detection of a zero crossing and transitions to a logic low level upon the falling edge of the CNT_CLR signal 226, as shown.

Also shown in FIG. 6 are the position signals POSA, POSB and POSC generated by the state machine 76. The decoder and drive signal generator 80 is responsive to the position signals, as well as to the GATE_PWM signal, for generating the drive signals P1, N1 P3, N3 which control the switches 34-44 associated with the motor, respectively. To this end, the decoder 80 decodes the position signals in accordance with the following table:

| | INPUTS | | | OUTPUTS (Drive Signals) | | | | | |
|---|---|---|---|---|---|---|---|---|---|
| | (Position Signals) | | | High-Side | | | Low-Side | | |
| STATE | POSA | POSB | POSC | P1 | P2 | P3 | N1 | N2 | N3 |
| 1 | 1 | 0 | 1 | 1 | 0 | 0 | 0 | 1 | 0 |
| 2 | 1 | 0 | 0 | 1 | 0 | 0 | 0 | 0 | 1 |
| 3 | 1 | 1 | 0 | 0 | 1 | 0 | 0 | 0 | 1 |
| 4 | 0 | 1 | 0 | 0 | 1 | 0 | 1 | 0 | 0 |
| 5 | 0 | 1 | 1 | 0 | 0 | 1 | 1 | 0 | 0 |
| 6 | 0 | 0 | 1 | 0 | 0 | 1 | 0 | 1 | 0 |

Both the low and high side switches are closed in response to a high (1) drive signal and opened in response to a low (0) drive signal. Recall that certain ones of the drive signals thus generated are chopped in accordance with the GATED_PWM signal.

Figure 7:
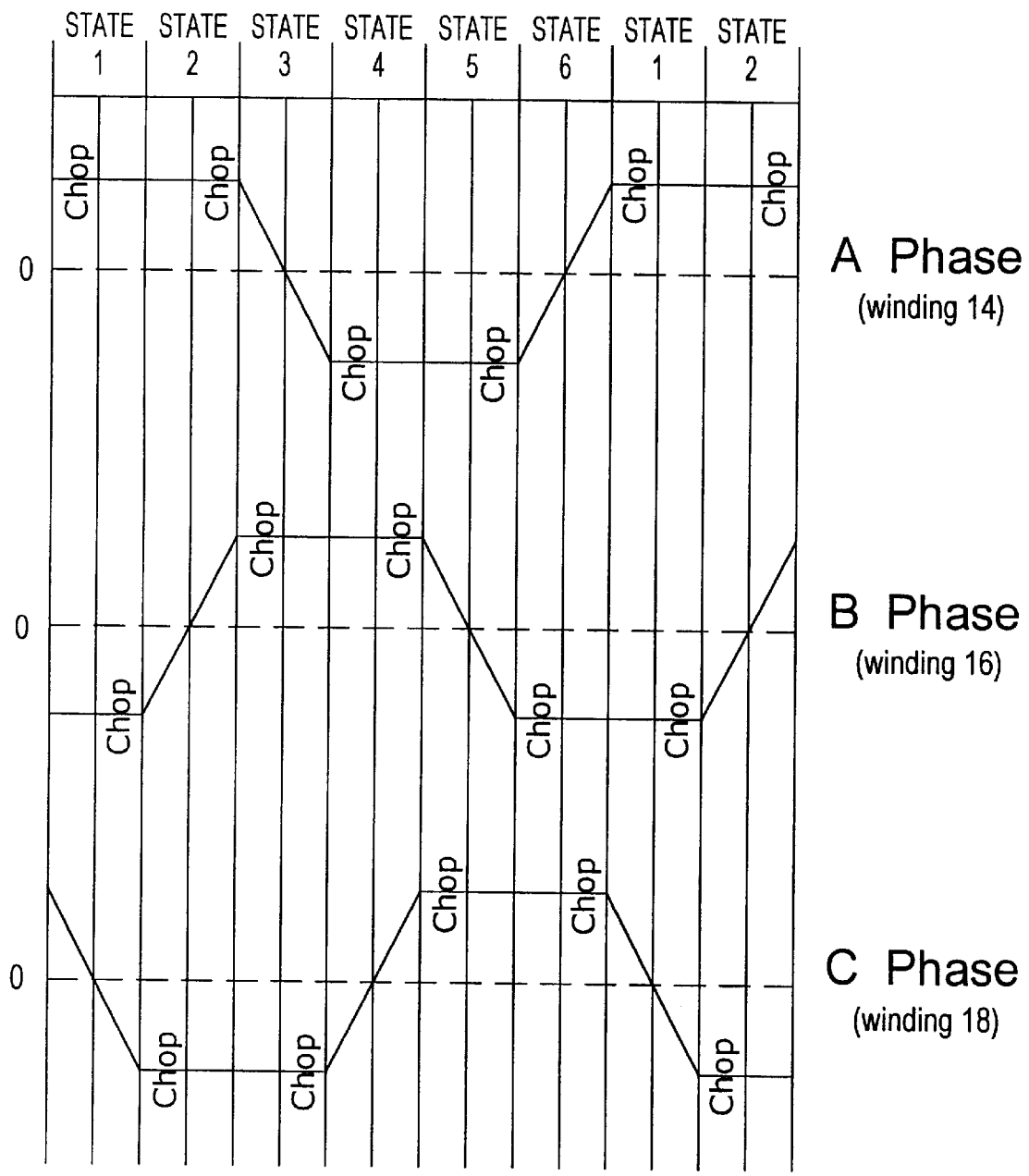
FIG. 7 shows the voltage across each of the motor windings with an indication of when the switches associated with each winding are chopped in accordance with an alternating chopping scheme.

Referring also to FIG. 7, the voltage across each of the motor windings 14, 16 and 18 is shown. Also shown in FIG. 7 is an indication of which of the switches associated with each of the driven windings is chopped by the GATED_PWM signal. Also shown in FIG. 7 is the state of operation relative to various portions of the winding voltages.

Considering state 1 for example, it is apparent from the voltage waveforms that winding 18 is floating while windings 14 and 16 are energized. More particularly, during state 1, the high side switch 34 associated with winding 14 conducts (i.e., since winding 14 is positively energized) and the low side switch 40 associated with winding 16 conducts (i.e., since winding 16 is negatively energized). The switches 34-44 are chopped such that the high side switch associated with the positively energized winding is chopped when the sensed back EMF is greater than zero; whereas, the low side switch associated with the negatively driven winding is chopped when the sensed back EMF is negative. During the first portion of state 1, the sensed back EMF across floating winding 18 is greater than zero. Thus, the high side switch 34 associated with the positively energized winding 14 is chopped. During the second portion of state 1, the sensed back EMF across winding 18 is negative. Thus, the low side switch 40 associated with the negatively energized winding 16 is chopped, as indicated.

In subsequent state 2, winding 16 is floating. During a first portion of state 2, the back EMF across floating winding 16 is negative. Thus, the low side switch 44 of the negatively energized winding 18 is chopped. During the second portion of state 2 operation, the back EMF across winding 16 is positive. Thus, during this interval, the high side switch 34 associated with the positively driven winding 14 is chopped, as shown. Operation of the motor continues in this manner during subsequent commutation states.

With the alternate chopping of high and low side switches implemented herein, the average voltage at the centertap terminal 26 is maintained at one-half of the supply voltage level. Moreover, the voltage across the floating winding is prevented from exceeding the supply voltage level. This arrangement is advantageous since it prevents current from being induced in the floating winding and thus, eliminates the delay necessary to dissipate such energy.

Referring now also to FIG. 8, the voltage across the floating winding when the energized windings are chopped in accordance with the above-described scheme is shown. As is apparent, the voltage swing across the floating winding never exceeds the supply voltage level.

Having described the preferred embodiments of the invention, it will now become apparent to one of skill in the art that other embodiments incorporating their concepts may be used. It is felt therefore that these embodiments should not be limited to disclosed embodiments but rather should be limited only by the spirit and scope of the appended claims.

We claim:

1. A DC motor controller for controlling a brushless DC motor having a plurality of windings sequentially energized by a plurality of electronically controlled switches connecting each of said windings to a negative terminal or a positive terminal of a DC voltage supply in response to a corresponding plurality of drive signals, said controller comprising:

a track and hold circuit for tracking the voltage across one of said windings during a first interval when at least another one of said windings is energized and for holding said tracked voltage during a second interval when said at least another one of said windings is de-energized and for a predetermined delay interval thereafter;

a zero crossing comparator for comparing said held voltage to a reference voltage to provide an output signal indicative of when the voltage across said winding crosses said reference voltage; and a decoder responsive to said output signal of said zero crossing comparator for providing said plurality of drive signals.

2. The DC motor controller recited in claim 1 further comprising a control logic circuit responsive to said output signal of said zero crossing comparator for providing an input signal to said decoder.

3. The DC motor controller recited in claim 1 wherein said track and hold circuit comprises an electronically controlled switch connected in series with a resistor and a capacitor connected between said electronically controlled switch and a reference potential.

4. The DC motor controller recited in claim 1 wherein said plurality of electronically controlled switches comprises a plurality of pairs of switching transistors, each pair being associated with a respective one of said plurality of windings and including a high side switch connected to the positive terminal of said DC voltage supply and a low side switch connected to the negative terminal of said DC voltage supply, wherein an interconnection between each of said pairs of transistors is connected to a terminal of a respective winding.

5. A DC motor controller for controlling a brushless DC motor having a plurality of windings connected to a corresponding plurality of pairs of switching transistors, each pair having a common connection to a terminal of a corresponding one of said plurality of windings and including a high side switch connected to the positive terminal of a DC voltage supply and a low side switch connected to a negative terminal of said DC voltage supply, said switches operative to sequentially energize said plurality of windings by connecting each of said windings to the negative terminal or the positive terminal of the DC voltage supply in response to a corresponding plurality of drive signals, said controller comprising:

a track and hold circuit for tracking the voltage across one of said windings and holding said tracked voltage;

a zero crossing comparator for comparing said held voltage to a reference voltage to provide an output signal indicative of when the voltage across said winding crosses said reference voltage; and a decoder responsive to said output signal of said zero crossing comparator for providing said plurality of drive signals such that the low side switch of the pair of switching transistors associated with a negatively energized winding is chopped when said tracked and held voltage is negative and the high side switch of the pair of switching transistors associated with a positively energized winding is chopped when said tracked and held voltage is positive.

6. The DC motor controller recited in claim 1 wherein said motor has a centertap terminal, said track and hold circuit further tracks the voltage at said centertap terminal and holds said tracked voltage, and said reference voltage is provided by said tracked and held centertap voltage.

7. A DC motor controller for controlling a brushless DC motor having a plurality of windings and a plurality of electronically controlled switches for sequentially energizing said plurality of windings by connecting each of said windings to a negative terminal or a positive terminal of a DC voltage supply in response to a corresponding plurality of drive signals, said controller comprising:

a track and hold circuit for tracking the voltage across one of said windings and holding said tracked voltage;

a zero crossing comparator for comparing said held voltage to a reference voltage to provide an output signal indicative of when the voltage across said winding crosses said reference voltage;

a decoder responsive to said output signal of said zero crossing comparator for providing said plurality of drive signals; and a PWM circuit responsive to a motor parameter for generating a PWM signal coupled to said decoder and used by said decoder to chop said drive signals, said PWM circuit inhibiting said PWM signal for an interval prior to and during when said voltage across said winding crosses said reference voltage.

8. The DC motor controller recited in claim 7 wherein said motor parameter is motor speed.

9. A DC motor controller for controlling a brushless DC motor having a plurality of windings and a plurality of electronically controlled switches for sequentially energizing said plurality of windings by connecting each of said windings to a negative terminal or a positive terminal of a DC voltage supply in response to a corresponding plurality of drive signals, said controller comprising:

a track and hold circuit for tracking the voltage across one of said windings and holding said tracked voltage;

a zero crossing comparator for comparing said held voltage to a reference voltage to provide an output signal indicative of when the voltage across said winding crosses said reference voltage;

a decoder responsive to said output signal of said zero crossing comparator for providing said plurality of drive signals; and an interpolation circuit for interpolating said tracked and held voltage.

10. A brushless DC motor controller for controlling a motor having a plurality of windings, wherein said motor is commutated by a plurality of switching circuits, each associated with a respective one of said plurality of windings and comprising a high side switch connected to a positive terminal of a voltage supply and a low side switch connected to a negative terminal of said voltage supply, wherein each of said switches is controlled by a respective drive signal, said controller comprising:

a back EMF sensing circuit for sensing the back EMF across a floating one of said plurality of windings; and a decoder responsive to said sensed back EMF for generating said drive signals such that said high side switch associated with a positively energized winding is chopped when said sensed back EMF is positive and wherein said low side switch associated with a negatively energized winding is chopped when said sensed back EMF is negative.

11. The DC motor controller recited in claim 10 wherein said back EMF sensing circuit comprises a track and hold circuit for tracking the voltage across said floating winding and holding said tracked voltage; and a zero crossing comparator for comparing said tracked and held voltage to a reference voltage, said zero crossing comparator providing an output signal indicative of when said back EMF across said floating winding crosses said reference voltage.

12. The DC motor controller recited in claim 11 wherein said motor has a centertap terminal, said track and hold circuit further tracks the voltage at said centertap terminal and holds said tracked voltage, and said reference voltage is provided by said tracked and held centertap voltage.

13. The DC motor controller recited in claim 11 wherein said tracked and held voltage is interpolated.

14. The DC motor controller recited in claim 10 further comprising a PWM circuit responsive to a motor parameter for generating a PWM signal coupled to said decoder, wherein said PWM signal is inhibited for an interval prior to and during when said voltage across said floating winding crosses said reference voltage.

15. The DC motor controller recited in claim 14 wherein said motor parameter is motor speed.

16. A DC motor controller for controlling a motor comprising a plurality of windings and a plurality of electronically controlled switches for sequentially energizing said plurality of windings in response to a corresponding plurality of drive signals, said controller comprising:

a rotor position sensing circuit for sensing when the voltage across one of said plurality of windings experiences a zero crossing by crossing a reference voltage level;

a motor parameter sensing circuit for sensing a parameter of said motor selected from the group consisting of: motor speed, motor torque, or motor acceleration;

a PWM circuit responsive to said sensed motor parameter for generating an error signal indicative of the difference between said sensed signal and a desired value for said motor parameter and for generating a PWM signal in response to said error signal, wherein said PWM signal is used to selectively chop said drive signals; and a PWM disable circuit for disabling said PWM circuit prior to and during said zero crossing.

17. The DC motor controller recited in claim 16 wherein said rotor position sensing circuit comprises a track and hold circuit for tracking the voltage across said one of said plurality of windings and holding said voltage; and a zero crossing comparator responsive to said tracked and held voltage and to a reference voltage for detecting said zero crossing.

18. The DC motor controller recited in claim 16 wherein said PWM disable circuit comprises a buffer amplifier coupled to a centertap terminal of said motor and providing a buffered output signal;

an offset voltage coupled to and summed with said output signal of said buffer amplifier; and a gating comparator for comparing said sensed winding voltage to said summed voltage to provide a gating signal for inhibiting said PWM signal.

19. A method for sensing the position of a rotor relative to a stator having a plurality of windings associated therewith, said method comprising the steps of:

tracking the voltage across a selected one of said windings;

holding said winding voltage;

comparing said held voltage to a reference voltage to detect a crossing of said winding voltage with said reference voltage; and interpolating said held winding voltage to smooth said voltage.

20. The method recited in claim 19 further comprising the steps of:

tracking the voltage at the centertap terminal of said motor;

holding said centertap voltage to provide said reference voltage; and comparing said held centertap voltage to said held winding voltage to detect a crossing of said winding voltage with said centertap voltage.

21. A method for commutating a motor having a plurality of windings comprising the steps of:

sensing the back EMF across a floating one of said plurality of windings;

chopping a high side switch associated with a positively energized one of said plurality of windings when said sensed back EMF is positive; and chopping a low side switch associated with a negatively energized one of said plurality of windings when said sensed back EMF is negative.

22. A method of sensing the position of a rotor relative to a stator having a plurality of windings in order to commutate said motor by sequentially energizing said plurality of windings through a switch network comprising a plurality of switches controlled by a corresponding plurality of drive signals, said method comprising the steps of:

sensing when the back EMF across a first one of said plurality of windings experiences a zero crossing by crossing a reference voltage level;

sensing a parameter of said motor selected from the group consisting of: motor speed, motor torque, or motor acceleration;

generating a PWM signal in response to the sensed motor parameter, said PWM signal having a duty cycle corresponding to a desired value for said motor parameter;

generating said drive signals in response to said PWM signal; and inhibiting said PWM signal for an interval prior to and during said zero crossing.

23. The method recited in claim 22 wherein said PWM signal inhibiting step comprises the steps of summing the voltage at a centertap terminal of said motor with an offset voltage; and comparing said summed voltage to said sensed winding voltage to provide a gating signal for inhibiting said PWM signal.

24. A DC motor controller for controlling a brushless DC motor having a plurality of windings and a plurality of pairs of electronically controlled switches for sequentially energizing said plurality of windings, each pair being associated with a respective one of said plurality of windings and including a high side switch connected to the positive terminal of a DC voltage supply and a low side switch connected to the negative terminal of said DC voltage supply, said controller comprising:

a track and hold circuit for tracking the voltage across one of said windings and holding said tracked voltage;

a zero crossing comparator for comparing said held voltage to a reference voltage to provide an output signal indicative of a zero crossing, when said held voltage crosses said reference voltage;

a control logic circuit responsive to said output signal of said zero crossing comparator for providing an plurality of position signals, each one corresponding to one of said plurality of windings;

a decoder responsive to said position signals for decoding said plurality of position signals to provide said plurality of drive signals such that the high side switch associated with a positively energized one of said plurality of windings is chopped when said held voltage is positive and wherein the low side switch associated with a negatively energized one of said plurality of windings is chopped when said held voltage is negative;

a speed sensing circuit for sensing the speed of rotation of said motor to provide a measured speed signal;

a PWM circuit responsive to said measured speed signal for generating a speed error signal indicative of the difference between said measured speed signal and a desired motor speed and for generating a PWM signal in response to said speed error signal, wherein said PWM signal is used to chop said drive signals; and a PWM disable circuit for inhibiting said PWM signal prior to and during said zero crossing.

\* \* \* \* \*

UNITED STATES PATENT AND TRADEMARK OFFICE
CERTIFICATE OF CORRECTION

PATENT NO    :   5,929,577
DATED        :   July 27, 1999
INVENTOR(S)  :   Robert A. Neidorff et al.

It is certified that error appears in the above-identified patent and that said Letters Patent are hereby corrected as shown below:

Column 6, line 28 reads, "supply voltage."

should read, --supply voltage level.--.

Column 11, lines 12-13 reads, "the Z-X signa, the GATE_CLR signal and the CNT_CLR signal"

should read, --a Z-X signal, a GATE_CLR signal and a CNT_CLR signal--.

Signed and Sealed this

Tenth Day of April, 2001

Attest:

NICHOLAS P. GODICI

Attesting Officer

Acting Director of the United States Patent and Trademark Office